United States Patent [19]

Park

[11] Patent Number: 5,636,189

[45] Date of Patent: Jun. 3, 1997

[54] ASTIGMATIC METHOD FOR DETECTING A FOCUSSING ERROR IN AN OPTICAL PICKUP SYSTEM

[75] Inventor: Chan-Kyu Park, Seoul, Rep. of Korea

[73] Assignee: Daewoo Electronics Co., Ltd., Seoul, Rep. of Korea

[21] Appl. No.: 335,006

[22] Filed: Nov. 7, 1994

[30] Foreign Application Priority Data

Nov. 5, 1993 [KR] Rep. of Korea ............... 23462

[51] Int. Cl.$^6$ ............................................. G11B 7/095
[52] U.S. Cl. ................................. 369/44.23; 369/112
[58] Field of Search .............................. 369/44.23, 112, 369/109, 44.14, 103; 359/654–657; 250/201.5

[56] References Cited

U.S. PATENT DOCUMENTS

| 4,501,493 | 2/1985 | Kubota | 369/44.23 |
| 5,161,139 | 11/1992 | Inoue et al. | 369/44.23 |
| 5,195,072 | 3/1993 | Fukui et al. | 369/44.23 |

FOREIGN PATENT DOCUMENTS

| 0033642 | 2/1984 | Japan | 364/66.23 |

*Primary Examiner*—Thang V. Tran
*Attorney, Agent, or Firm*—Anderson Kill & Olick P.C.

[57] ABSTRACT

An optical pickup system for determining a focussing error by utilizing an improved astigmatic method, the system comprising: a light source; an optical detector, including a square light-reception surface formed by arranging four square photoelectric cells; a beam splitter provided with a reflection surface for reflecting the light beam from the light source and for transmitting the light beam reflected from the recording surface; a first and a second adders for adding outputs from each of two opposite corners of the square light-reception surface; an objective lens, disposed between the beam splitter and the optical disk; a graded index lens, located between the beam splitter and the optical detector, for making the light beam transmitted through the beam splitter astigmatic as it passes therethrough; and a differential amplifier for generating a focussing error signal.

1 Claim, 5 Drawing Sheets

ASTIGMATIC METHOD FOR DETECTING A FOCUSSING ERROR IN AN OPTICAL PICKUP SYSTEM

FIELD OF THE INVENTION

The present invention relates to an optical pickup system; and, more particularly, to an optical pickup system capable of detecting a focussing error by utilizing an astigmatic method incorporating therein a graded index lens.

BACKGROUND OF THE INVENTION

One of the common difficulties in an optical information recording disk, e.g., laser disk, lies in the occurrence of focussing errors. An astigmatic method has been introduced to solve the problem.

In FIG. 1, there is illustrated a prior art optical system 10 utilizing the astigmatic method, as disclosed in U.S. Pat. No. 4,023,033, entitled "Optical Focussing Device" and is incorporated herein by reference.

The optical pickup system 10 comprises a light source 11, a beam splitter 12, an objective lens 13, an optical information recording disk 14 (hereinafter referred to as an optical disk), a cylindrical lens 15, a first adder 16, a second adder 17, an optical detector 18 and a differential amplifier 19. In the system, a light beam 20 emitted from the light source 11, e.g., a laser diode, enters the beam splitter 12 and is partially reflected by a reflection surface 21 incorporated therein. The light beam reflected from the reflection surface 21 is radiated through the objective lens 13 onto a recording surface 22 of the optical disk 14 as a focussed light beam. The focussed light beam reflected from the optical disk 14 is converged by the objective lens 13 and transmitted through the beam splitter 12. The focussed light beam transmitted through the beam splitter 12 is made astigmatic by its passage through the cylindrical lens 15 and thereafter is made to impinge onto the optical detector 18 including a square light-reception surface 23 formed by arranging four square photoelectric cells (not shown). Each of the photoelectric cells generates an output in the form of a light intensity measurement. Two outputs from two opposite corners of the square light-reception surface 23 are sent to the first adder 16, and two outputs from the remaining two opposite corners are sent to the second adder 17, respectively. Outputs from the first and second adders 16, 17 are then sent to the differential amplifier 19, which will in turn generate an associated focussing error signal by comparing the outputs from the first and second adders 16, 17, the focussing error simply being a difference of the two outputs therefrom. Being astigmatic, the shape of the luminous flux imaged on the four square photoelectric cells of the square light-reception surface 23 of the optical detector 18 changes depending on the positional relationship between the recording surface 22 of the optical disk 14 and a convergence point 24. In order to detect this change in the shape of the luminous flux, the cylindrical lens 15 is arranged exactly between the convergence point 24 and the optical detector 18 in such a way that the square light-reception surface 23 is disposed at the position where the shape of the luminous flux becomes circular when it is focussed (zero focussing error) and this is known a "just focussed" position. If the optical disk 14 is displaced in a vertical direction from the just focussed position, the focussing error signal generated by the differential amplifier 19 becomes non-zero with the sign indicating the direction of displacement. This conventional astigmatic method requires the cylindrical lens 15 to focus the light beam spot on the square light-reception surface 23 in an astigmatic manner. Since, however, the conventional cylindrical lens employed therein is not planar, it is rather difficult to align it accurately with the convergence point 24 and the optical detector 18.

SUMMARY OF THE INVENTION

It is, therefore, a primary object of the present invention to provide an astigmatic method for use in an optical pickup system having an improved ability to be aligned accurately.

In accordance with the present invention, there is provided an optical pickup system for determining a focussing error by utilizing an improved astigmatic method, the system comprising: a light source for generating a light beam; an optical detector, including a square light-reception surface formed by arranging four square photoelectric cells, each of the four photoelectric cells generating an output in the form of a light intensity measurement, wherein the optical detector and a convergence point located on an optical disk from an optical axis; a beam splitter provided with a reflection surface for reflecting the light beam from the light source to a recording surface of an optical disk and for transmitting the light beam reflected from the recording surface of the optical disk to the optical detector, wherein the reflection surface is positioned in such a way that it is inclined with respect to the optical axis; a first adder for adding outputs from two opposite corners of the square light-reception surface; a second adder for adding output from the remaining two corners of the square light-reception surface; an objective lens, disposed between the beam splitter and the optical disk, for focussing the light beam reflected by the beam splitter on the recording surface and for converging the light beam reflected from the recording surface of the optical disk into the reflection surface of the beam splitter; a graded index lens for making the light beam transmitted through the beam splitter astigmatic as it passes therethrough, wherein the graded index lens is located between the beam splitter and the optical detector, provided with a vertical center plane and a position dependent refractive index distribution; and a differential amplifier for generating a focussing error signal by comparing two outputs from the first and second adders.

BRIEF DESCRIPTION OF THE DRAWINGS

The present invention together with the above and other objects and advantages will become more apparent from the following description of preferred embodiment given in conjunction with the accompanying drawings, wherein.

DETAIL DESCRIPTION OF THE PREFERRED EMBODIMENT

Figure 2:
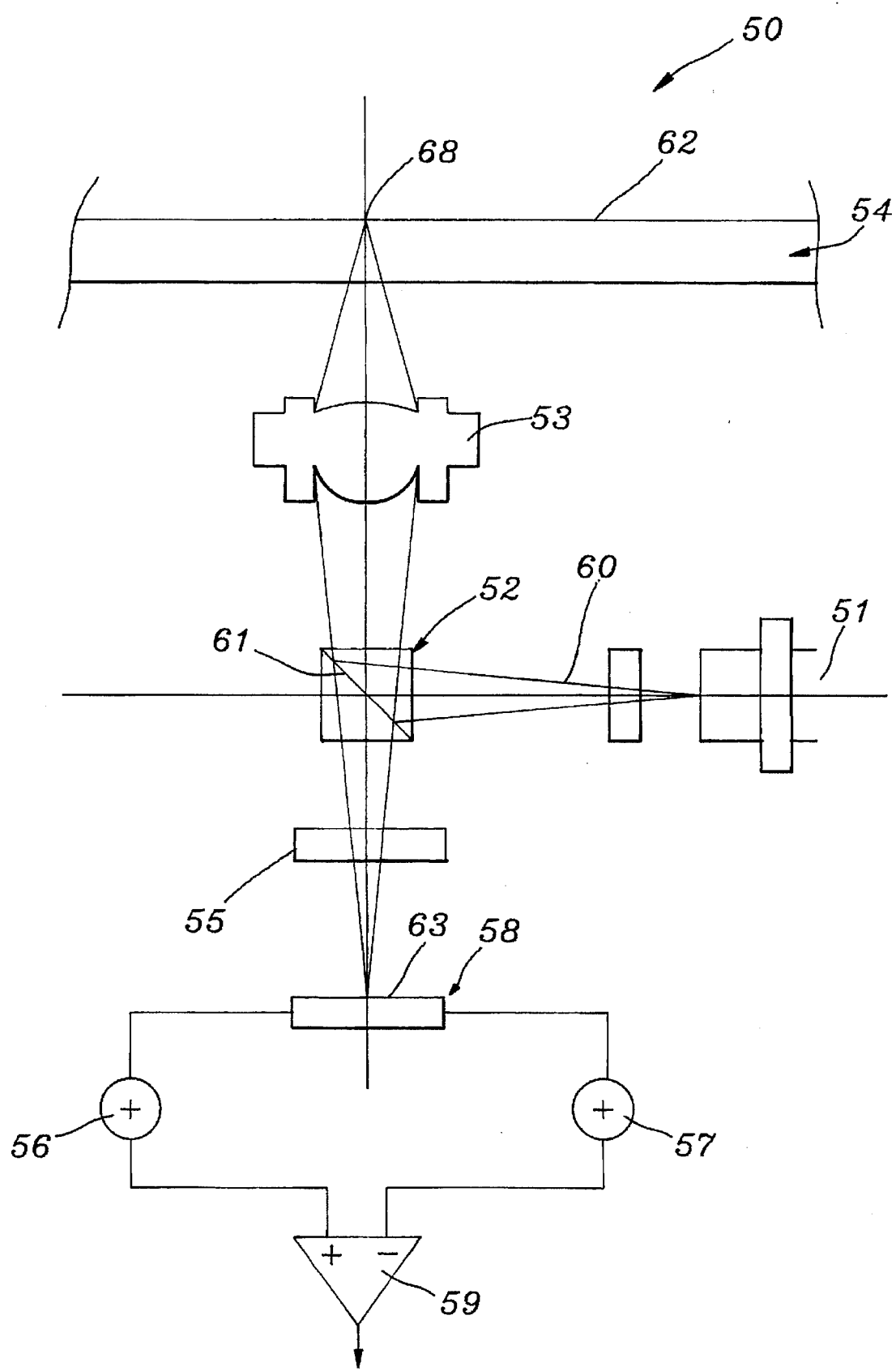
FIG. 2 illustrates a schematic view of the inventive astigmatic method in accordance with a preferred embodiment of the present invention.

In FIG. 2, there is illustrated a schematic view of the inventive optical pickup system 50 utilizing the astigmatic method incorporating therein a graded index lens 55.

Figure 3:
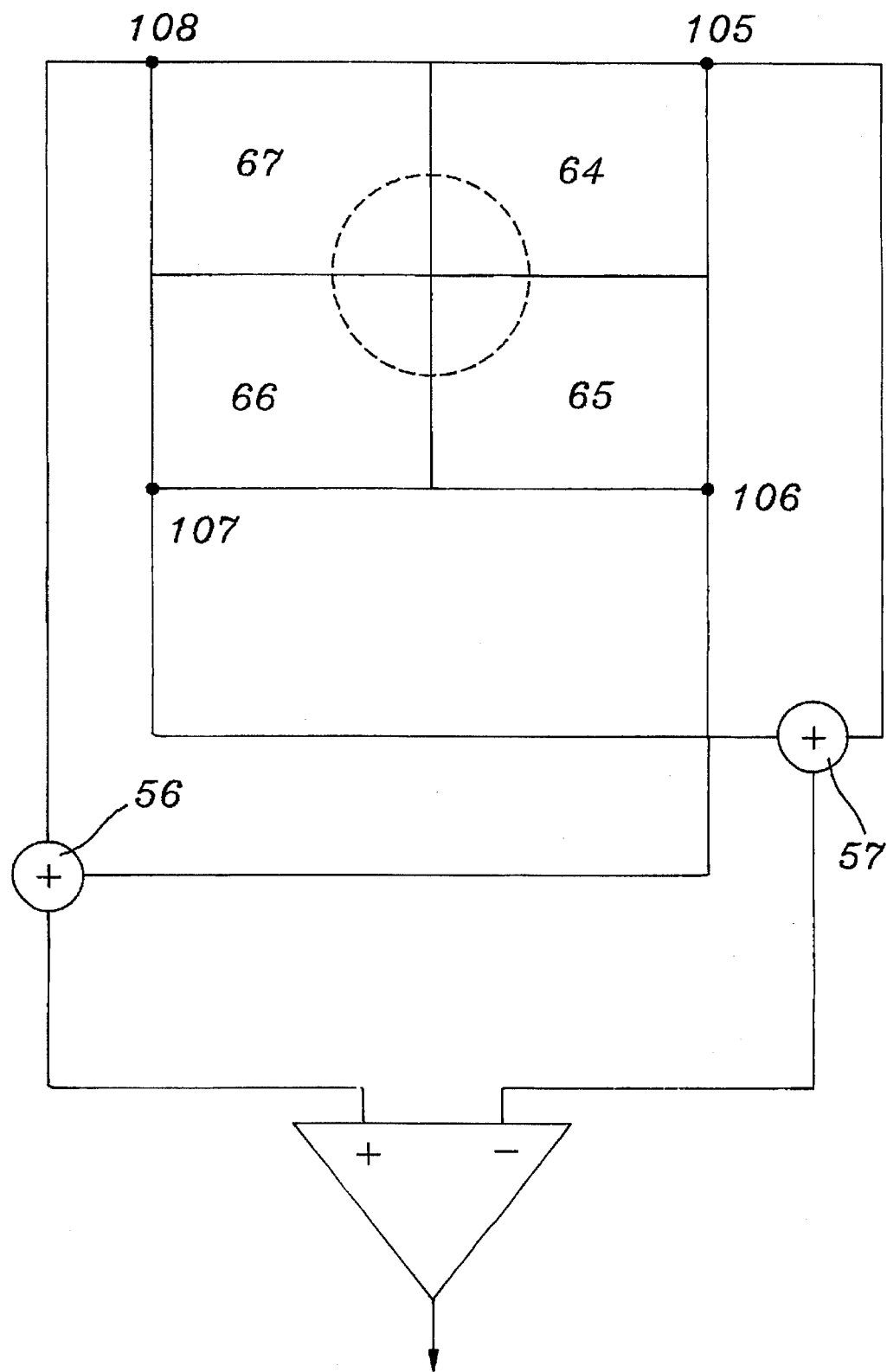
FIG. 3 shows four square photoelectric cells arranged to form a square light-reception surface.

The inventive optical pickup system 50 comprises a light source 51, a beam splitter 52, an objective lens 53, an optical information recording disk 54 (hereinafter referred to as an optical disk), a graded index lens 55, a first adder 56, a second adder 57, an optical detector 58 and a differential amplifier 59. In the system, a light beam 60 emitted from the light source 51, e.g., a laser diode, enters the beam splitter 52 and is partially reflected by a reflection surface 61 incorporated therein. The light beam reflected from the reflection surface 61 is radiated through the objective lens 53 onto a recording surface 62 of the optical disk 54 as a focussed light beam. The focussed light beam reflected from the optical disk 54 is converged by the objective lens 53 and transmitted through the beam splitter 52. The focussed light beam transmitted through the beam splitter 52 is made astigmatic by its passage through the graded index lens 55 and thereafter is made to impinge onto the optical detector 58 including a square light-reception surface 63 formed by arranging four photoelectric cells 64, 65, 66, 67, as shown in FIG. 3. Each of the photoelectric cells, e.g., 64, generates an output in the form of a light intensity measurement. Two outputs from two opposite corners, e.g., 105, 107 of the square light-reception surface 63 are sent to the first adder 56, and two outputs from the remaining two opposite corners, e.g., 106, 108 are sent to the second adder 57, respectively. Outputs from the first and second adders 56, 57 are then sent to the differential amplifier 59, which will in turn generate an associated focussing error by comparing the outputs from the first and second adders 56, 57, the focussing error simply being a difference of the two outputs from the pair of adders.

Being astigmatic, the shape of the luminous flux imaged on the square light-reception surface 63 of the optical detector 58 changes depending on the positional relationship between the recording surface 62 of the optical disk 54 and a convergence point 68 of the light beam. In order to detect this change in the shape of the luminous flux, the graded index lens 55 is arranged exactly between the convergence point 68 and the optical detector 58 in such a way that the square light-reception surface 63 is disposed at the position where the shape of the luminous flux becomes circular when it is focussed (zero focussing error), and this is known a "just focussed" position. If the optical disk 54 is displaced in a vertical direction from the just focussed position, the focussing error signal becomes non-zero with the sign indicating the direction of displacement.

Figure 4:
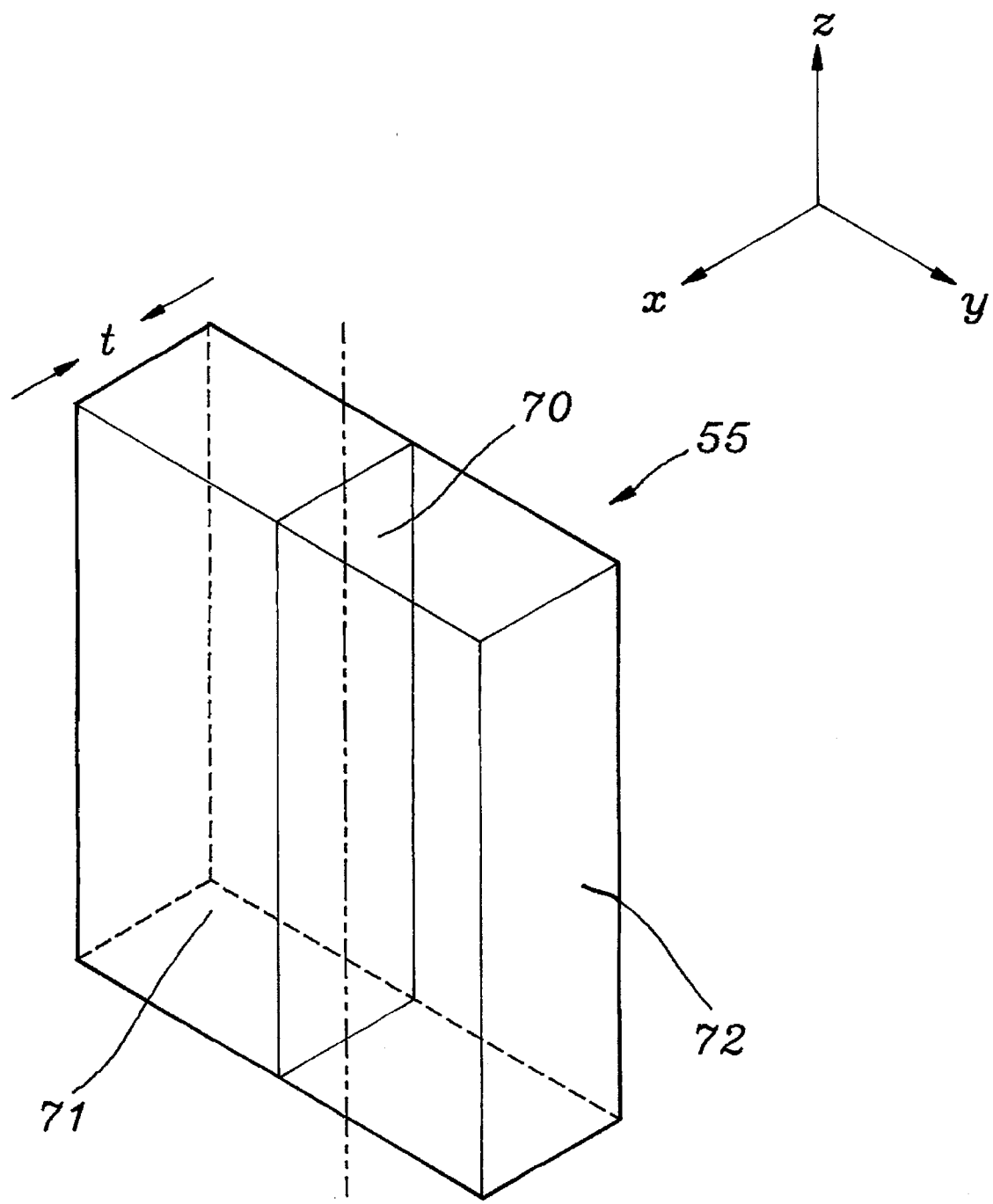
FIG. 4 depicts a schematic view of the graded index lens used in the present invention.

There is illustrated in FIG. 4 a perspective view of the hexahedron graded index lens 55 incorporated in the inventive optical pickup system 50. The graded index lens 55 is characterized in that: (1) it is made of a light refractive material; (2) it is provided with a uniform thickness t and a vertical center plane 70 parallel to the x-z plane; (3) it includes a pair of parallel and flat side surfaces 71, 72 for the light beam to enter and exist; and (4) it has a position dependent refractive index distribution, the distribution being symmetrical with respect to the vertical center plane 70. The position dependent refractive index distribution thereof can be described by the following equation:

$$n^2(r) = n_0^2[\text{sech}(gr)]^2 \quad \text{Eq.(1)}$$

wherein;
$n_0$ = refractive index along the optical axis;
$g$ = the refractive index distribution constant; and
$r$ = the circular beam radius.

Figure 1:
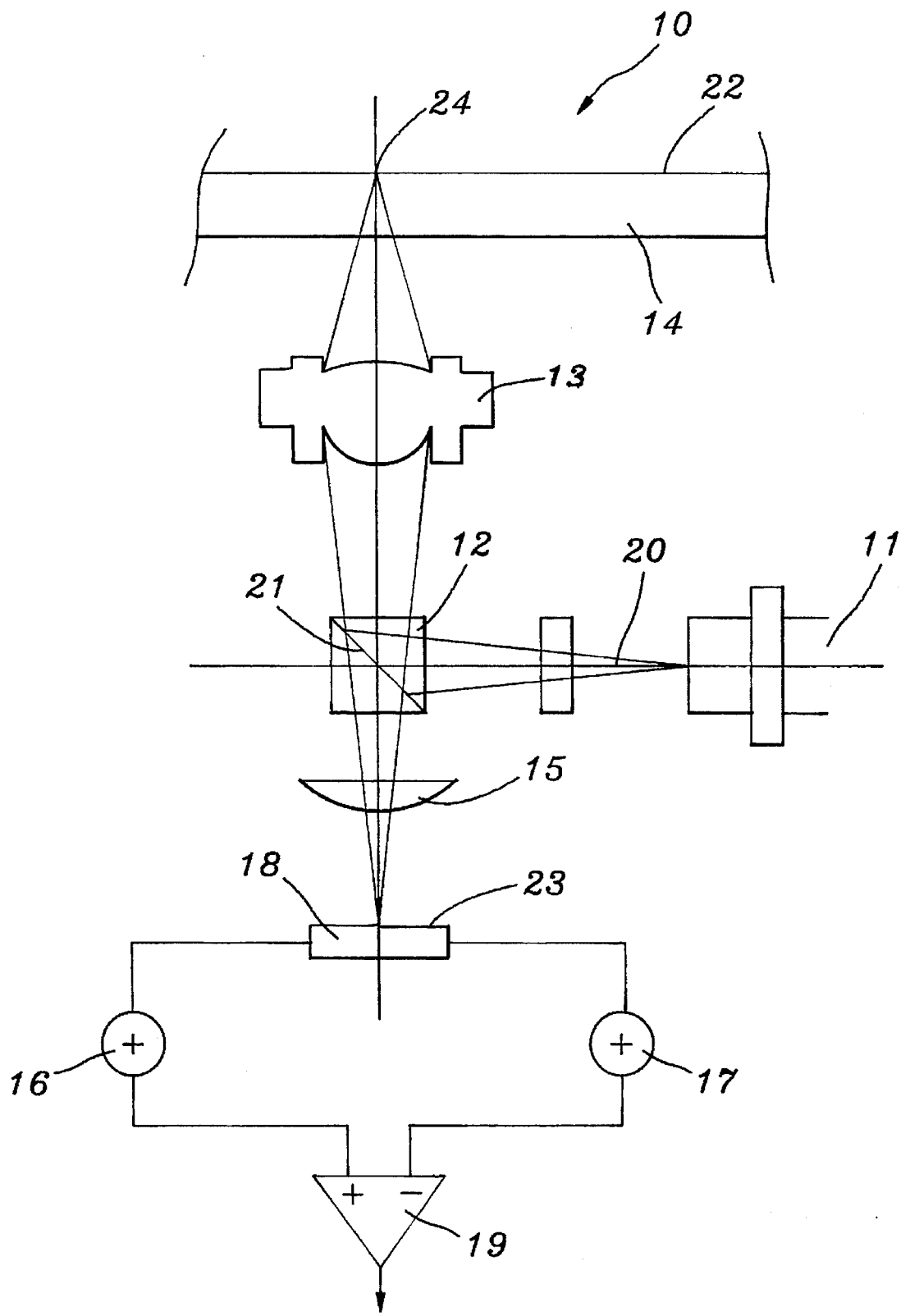
FIG. 1 represents a schematic view of prior art optical pickup system utilizing a cylindrical lens.
Figure 5:
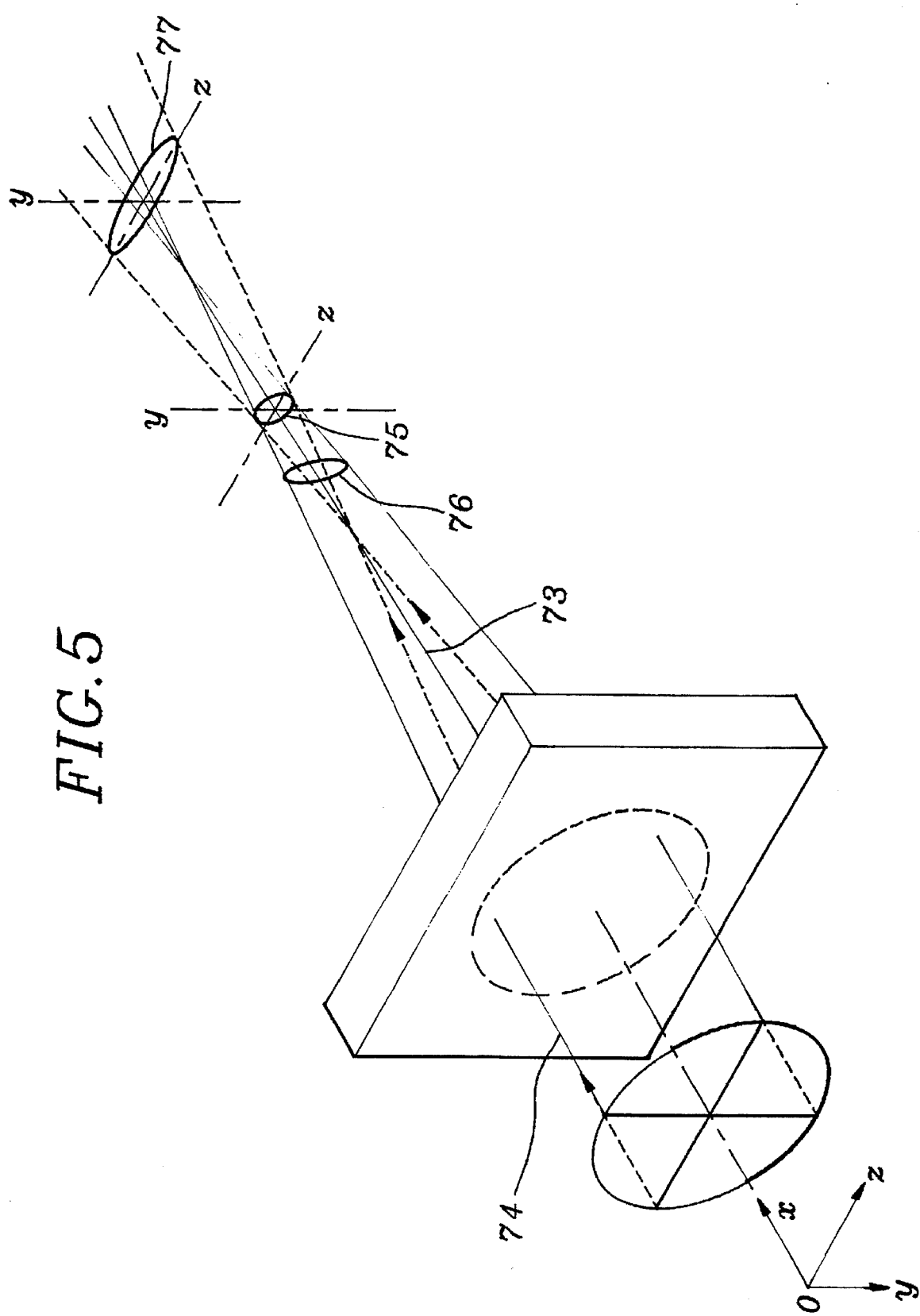
FIG. 5 presents a perspective view of the astigmatic method utilizing the graded index lens.

In FIG. 5, there is depicted a schematic view of an astigmatic method incorporating the graded index lens 55. The graded index lens 55 serves similar functions as those of the cylindrical lens 15 shown in FIG. 1, allowing the z-axis to act as conventional collimating lens, x-axis as the optical axis and y-axis as a plane glass. There is interposed on the axis 73 the graded index lens 55 arranged in the path of a transmitting light beam 74 to thereby render the optical system astigmatic in character. As those skilled in the art will understand, the transmitted light beam will form a circular beam spot 75 when the optical disk 54 is placed at the just focussed position, an elliptic beam spot 76 elongated in the y-axis direction when the optical disk 54 moves away from the graded index lens 55, and an elliptic beam spot 77 elongated in the z-axis direction when the optical disk 54 moves toward the graded index lens 55, resulting in the change of the shape of the luminous flux imaged on each of the four square photoelectric cells 64, 65, 66, 67.

As described above, it should appreciated that the use of the graded index lens in place of a conventional cylindrical lens in an optical pickup system will improve the alignment accuracy, since the graded index lens 55 is planar, which will in turn allow easier assembly thereof.

While the present invention has been described with respect to the preferred embodiment, other modifications and variations may be made without departing from the scope of the present invention as set forth in the following claims.

What is claimed is:

1. An optical pickup system for determining a focussing error by utilizing an improved astigmatic method, the system comprising:

a light source for generating a light beam;

an optical detector, including a square light-reception surface formed by arranging four square photoelectric cells, each of the four photoelectric cells generating an output in the form of a light intensity measurement;

a beam splitter provided with a reflection surface for reflecting the light beam from the light source to a recording surface of an optical disk and for transmitting the light beam reflected from the recording surface of the optical disk to the optical detector, wherein the reflection surface is positioned in such a way that it is inclined with respect to the optical axis;

a first adder for adding outputs from two opposite corners of the square light-reception surface;

a second adder for adding output from the remaining two corners of the square light-reception surface;

an objective lens, disposed between the beam splitter and the optical disk, for focussing the light beam reflected by the beam splitter on the recording surface and for converging the light beam reflected from the recording surface of the optical disk into the reflection surface of the beam splitter;

a planar graded index lens for making the light beam transmitted through the beam splitter astigmatic as it passes therethrough, wherein the graded index lens is located between the beam splitter and optical detector, provided with a vertical center plane and a position dependent refractive index distribution being cylindrically symmetric with respect to the vertical center plane; and a differential amplifier for generating a focussing error signal by comparing two outputs from the first and second adders.

* * * * *